(12) United States Patent
Son

(10) Patent No.: US 8,258,933 B2
(45) Date of Patent: Sep. 4, 2012

(54) PARKING GUIDANCE METHOD FOR VEHICLE

(75) Inventor: Jin Woo Son, Gyeonggi-Do (TW)

(73) Assignee: Hyundai Motor Company, Seoul (KR)

( * ) Notice: Subject to any disclaimer, the term of this patent is extended or adjusted under 35 U.S.C. 154(b) by 605 days.

(21) Appl. No.: 11/982,698

(22) Filed: Nov. 2, 2007

(65) Prior Publication Data

US 2008/0266137 A1    Oct. 30, 2008

(30) Foreign Application Priority Data

Apr. 30, 2007    (KR) .................. 10-2007-0041777

(51) Int. Cl.
*B60Q 1/00* (2006.01)

(52) U.S. Cl. .................. 340/435; 340/932.2; 340/932.1; 340/436

(58) Field of Classification Search .................. 340/32.1, 340/932.2, 934, 935, 936, 939, 941, 942, 340/943

See application file for complete search history.

(56) References Cited

U.S. PATENT DOCUMENTS

| | | | | |
|---|---|---|---|---|
| 5,043,902 A * | 8/1991 | Yokoyama et al. | ............ | 701/442 |
| 6,061,002 A * | 5/2000 | Weber et al. | ............... | 340/932.2 |
| 6,097,314 A * | 8/2000 | Desens et al. | ............... | 340/932.2 |
| 6,275,754 B1 * | 8/2001 | Shimizu et al. | .................. | 701/41 |
| 6,344,805 B1 * | 2/2002 | Yasui et al. | ................. | 340/932.2 |
| 6,476,730 B2 * | 11/2002 | Kakinami et al. | ......... | 340/932.2 |
| 6,483,429 B1 * | 11/2002 | Yasui et al. | .................... | 340/435 |
| 6,483,442 B2 * | 11/2002 | Shimizu et al. | ............ | 340/932.2 |
| 6,487,481 B2 * | 11/2002 | Tanaka et al. | .................... | 701/41 |
| 6,539,288 B2 * | 3/2003 | Ishida et al. | ...................... | 701/1 |
| 7,054,729 B2 * | 5/2006 | Maier et al. | ..................... | 701/36 |
| 7,070,247 B2 * | 7/2006 | Offerle | .......................... | 303/146 |
| 7,085,634 B2 * | 8/2006 | Endo et al. | ...................... | 701/36 |
| 7,205,905 B2 * | 4/2007 | Gotzig et al. | .............. | 340/932.2 |
| 7,363,130 B2 * | 4/2008 | Sakakibara | ..................... | 701/36 |
| 2002/0169552 A1 * | 11/2002 | Hashida | ......................... | 701/213 |
| 2002/0175832 A1 * | 11/2002 | Mizusawa et al. | ......... | 340/932.2 |
| 2006/0190147 A1 * | 8/2006 | Lee et al. | ........................ | 701/26 |

FOREIGN PATENT DOCUMENTS

| | | |
|---|---|---|
| JP | 2000-078566 | 3/2000 |
| JP | 2003-011762 | 1/2003 |
| KR | 1020040038880 | 5/2004 |
| KR | 1020040069961 A | 8/2004 |
| KR | 1020050060896 A | 6/2005 |
| WO | WO-2005/102823 A1 | 11/2005 |
| WO | WO-2005/108171 A1 | 11/2005 |

\* cited by examiner

*Primary Examiner* — Albert Wong
*Assistant Examiner* — Rufus Point
(74) *Attorney, Agent, or Firm* — Edwards Wildman Palmer LLP; Peter F. Corless

(57) ABSTRACT

The present invention provides parking guidance methods for a vehicle, which comprises: calculating an estimated backward track of the vehicle from a current steering angle detected by a steering angle sensor; calculating an estimated parking space from the estimated backward track and a relative angle inputted by a driver through an input means; converting coordinates of the calculated estimated backward track and estimated parking space into image coordinates; synthesizing the converted image coordinates with an image acquired by a camera provided at the rear of the vehicle; and displaying the synthesized image on a monitor of the vehicle. The methods enhances driver's convenience and safety in the event of back-in perpendicular parking.

18 Claims, 10 Drawing Sheets

PARKING GUIDANCE METHOD FOR VEHICLE

CROSS-REFERENCE TO RELATED APPLICATION

This application claims, under 35 U.S.C. §119(a), the benefit of Korean Patent Application No. 10-2007-041777 filed on Apr. 30, 2007, the entire contents of which are incorporated herein by reference.

BACKGROUND (a) Technical Field

The present invention relates to a parking guidance method. More particularly, the present invention relates to a parking guidance method for a vehicle, which displays on a monitor a straight section (estimated parking space) determined based on a relative angle input by a driver and an estimated backward track calculated from a steering angle, thereby enhancing driver's convenience and safety in the event of back-in perpendicular parking.

(b) Background Art

In general, an advanced safety vehicle (ASV) refers to a vehicle to which a variety of high technologies are applied for the purpose of enhancing driver's convenience and reducing vehicle accidents and saving energy.

As one of the safety and convenience systems widely applied to the ASV, various kinds of parking assistant systems such as back-in parking monitoring systems have been developed and provided. Such parking assistant systems help a driver back-in park conveniently and avoid vehicle collisions that may be caused due to an unintended departure from an appropriate parking lane.

As a back-in parking monitoring system, an image pick-up device for a vehicle has been proposed to prevent an accidental collision, in which a camera is mounted on the rear of the vehicle to display an image of the rear of the vehicle on a monitor.

The image pick-up device comprises an image input unit (camera) taking an image of the rear of the vehicle and outputting an image signal, a display unit (monitor) receiving the image signal output from the image input unit and displaying the corresponding image on a screen, and a control unit controlling the image transmission from the image input unit to the display unit.

As such, prior art parking monitoring systems equipped with such an image pick-up device merely display an image taken by a monitoring camera mounted on the rear of the vehicle on a monitor.

Accordingly, it has many drawbacks. For example, drivers must look at the monitor continuously while parking. Especially, inexperienced drivers may oftentimes cause an accidental collision due to an unintended departure from an appropriate parking lane.

In order to solve such drawbacks, many attempts have been made. For example, Korean Patent Publication No. 2005-60896 discloses a parking monitoring system that estimates a backward track of a vehicle using signals output from a vehicle speed sensor and a steering angle sensor mounted on the vehicle, synthesizes the estimated backward track with an image taken by a camera, and displays the synthesized image on a monitor, thus allowing the driver to identify the estimated backward track on the monitor while parking.

Also, Japanese Patent Publication No. 2000-78566 discloses a parking assistant device in which a camera picks up an image of the rear of a vehicle and a display device displays an estimated driving track synthesized based on a steering angle of the vehicle.

In addition, Japanese Patent Publication No. 2003-11762 discloses a parking assistant device that displays an image picked up by a camera mounted on a vehicle on a screen, a guide line in parallel to a line in contact with an estimated locus when the vehicle is moved back at a maximum steering angle of a steering wheel.

Moreover, Korean Patent Publication No. 2004-38880 discloses a parking support device that reads an estimated track corresponding to an initial position of a vehicle to be parked from a memory and displays a parking operation guide on a monitor screen.

As described above, the conventional parking assistant systems displays an image of the rear of a vehicle to a driver using a cameral mounted on the rear of the vehicle so as to allow the driver to recognize an obstacle when the vehicle is moved backward. In addition to the image, the prior art systems displays an estimated backward track according to a steering angle operated by the driver so as to allow the driver to determine whether or not the vehicle collides with an obstacle and to estimate a moving direction of the vehicle.

FIG. 1 is a diagram illustrating a conventional method for predicting a backward track when a vehicle is moved backward. Referring to the figure, when a vehicle rotates with respect to a point O on an extension line from a rear wheel axle, an estimated backward track 11 can be obtained by calculating radius of gyration R which is defined as the distance between the point O and a central point C of the rear wheel axle.

The radius of gyration R can be calculated by the following equation if a current steering angle of the vehicle is given.

$$R = I/\tan\phi$$

wherein I represents the distance between the front wheel axle and rear wheel axle, and $\phi$ represents a wheel angle, which can be calculated by '$\phi$=steering ratio×steering angle'.

In a vehicle equipped with the conventional parking assistant systems, the estimated backward track 11 according to a steering angle merely shows on a monitor a moving direction of the vehicle to a predetermined distance. Thus, it can only provide a driver with a rough guidance for perpendicular parking; it can hardly provide accurate guidance.

Referring to FIG. 2A, if the moving direction of the vehicle at an initial stop position for a perpendicular parking is not that much different from the direction of a parking space 1, the estimated backward track 11 will work. Referring to FIG. 2B, however, if the moving direction of the vehicle is almost perpendicular to the direction of the parking space 1, a problem occurs; as the estimated backward track 11 shows only a moving direction up to a predetermined distance, it cannot provide accurate guidance throughout the perpendicular parking.

Moreover, different drivers stop their vehicles for perpendicular parking in different positions. Even a particular single driver can stop his or her vehicle in different positions. Taking the above into consideration and in view of the characteristics of wide angle cameras used as a rear view camera, the prior art methods and systems can hardly provide accurate guidance.

Furthermore, since both relative distance and angle of the vehicle to the parking space 1 are changed according to the initial stop position of the vehicle, the prior art methods and systems cannot provide an accurate track for entering the parking space 1 to the driver and the driver thus has to change the steering angle continuously according to the circumstances.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to provide a parking guidance method for a vehicle that displays on a monitor a straight section (estimated parking space) with respect to a relative angle input by a driver and an estimated backward track with respect to a steering angle, thereby enhancing driver's convenience and safety in the event of back-in perpendicular parking.

In one aspect, the present invention provides a parking guidance method for a vehicle comprising: calculating an estimated backward track of the vehicle from a current steering angle detected by a steering angle sensor; calculating an estimated parking space from the estimated backward track and a relative angle inputted by a driver through an input means; converting coordinates of the calculated estimated backward track and estimated parking space into image coordinates; synthesizing the converted image coordinates with an image acquired by a camera provided at the rear of the vehicle; and displaying the synthesized image on a monitor of the vehicle.

The relative angle herein refers to an angle formed by a longitudinal axis of the vehicle which stops to park and a longitudinal axis of the vehicle which is placed in the estimated parking space.

The estimated parking space refers to a space placed on the estimated backward track at a position that satisfies the relative angle, the longitudinal direction of the space being in the direction tangential to the estimated backward track.

The estimated parking space comprises: two side guide lines and a front guide line. The side guide lines are in a direction tangential to the estimated backward track and are parallely spaced from each other with a distance that can receive a vehicle. The front guide line is in a direction perpendicular to the two side guide lines with a predetermined offset distance from the rear wheel axle toward the front of the vehicle.

In a preferred embodiment, when a driver adjusts the relative angle by operation of the input means, the estimated parking space is rotationally moved so as to fit the estimated backward track with respect to the current steering angle and the estimated parking space after the rotational movement is further displayed on the monitor.

In another preferred embodiment, when the driver adjusts the steering wheel angle by operation of steering wheel, the estimated parking space is moved in parallel so as to fit an estimated backward track with respect to an adjusted steering angle and the estimated parking space after the parallel movement is further displayed on the monitor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present methods will be particularly useful with a wide variety of motor vehicles.

Other aspects of the invention are discussed infra.

Figure 1:
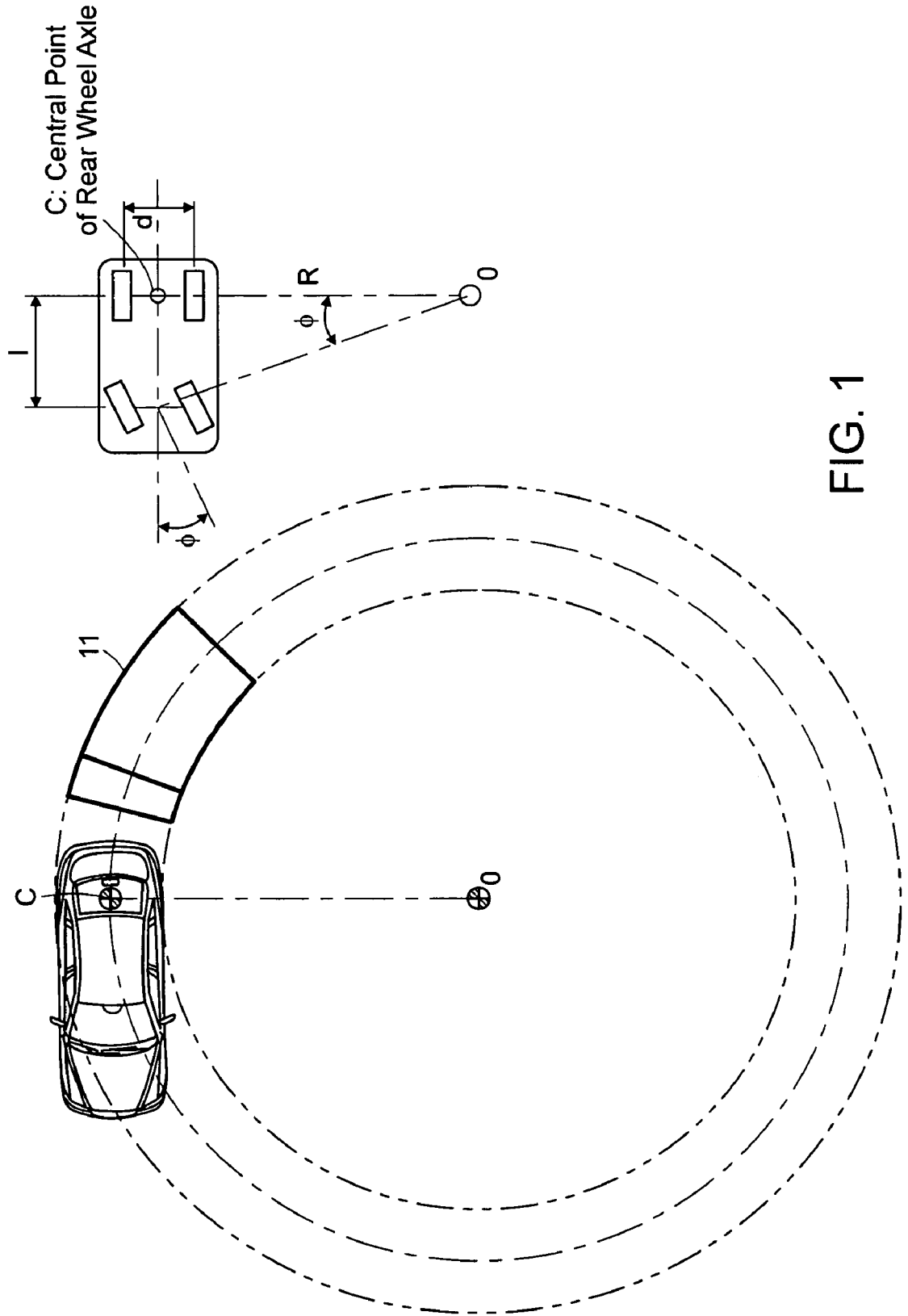
FIG. 1 is a diagram illustrating a conventional method for predicting a backward track when a vehicle is moved backward.
Figure 2A:
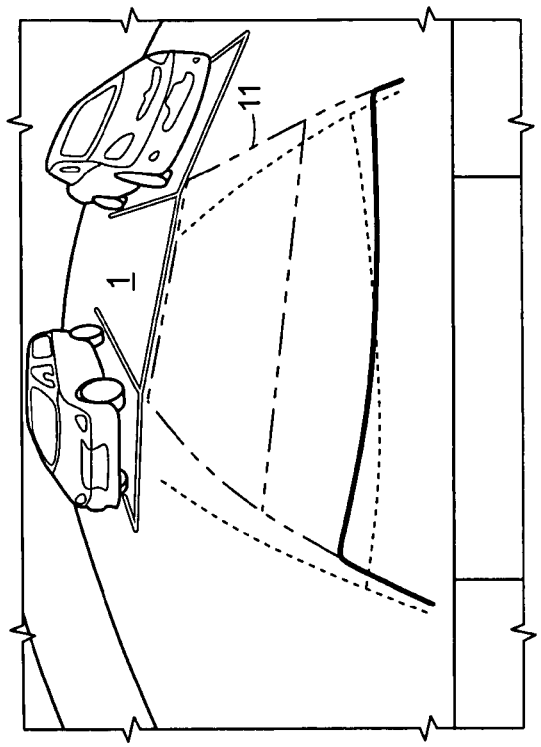
FIGS. 2A and 2B are diagrams illustrating a problem associated with the conventional method.
Figure 2A:
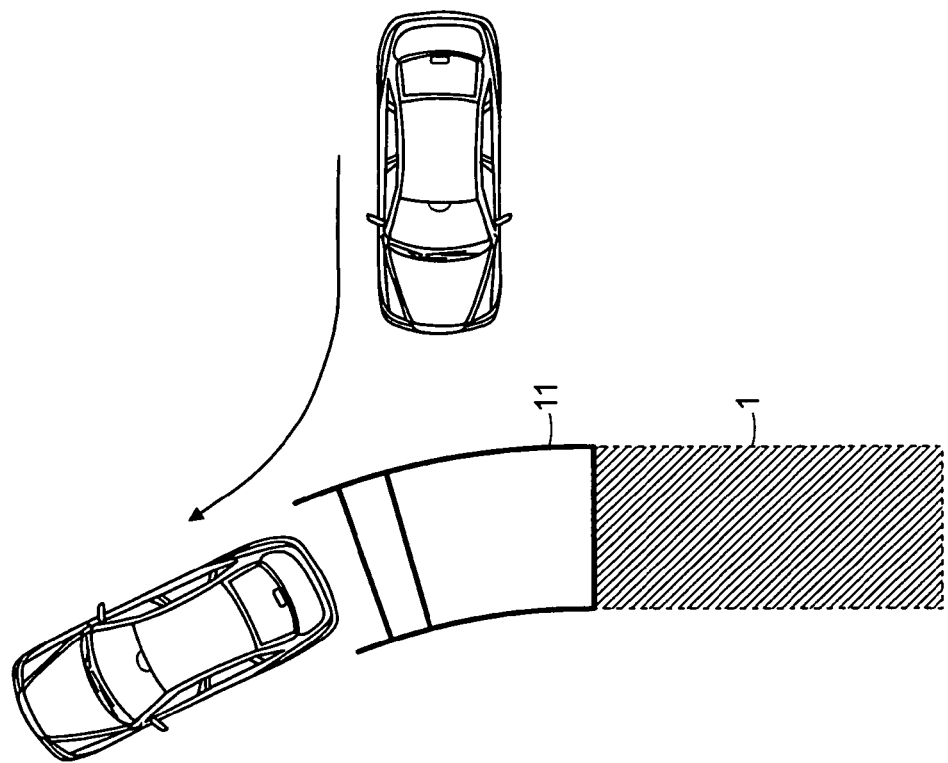
Figure 2B:
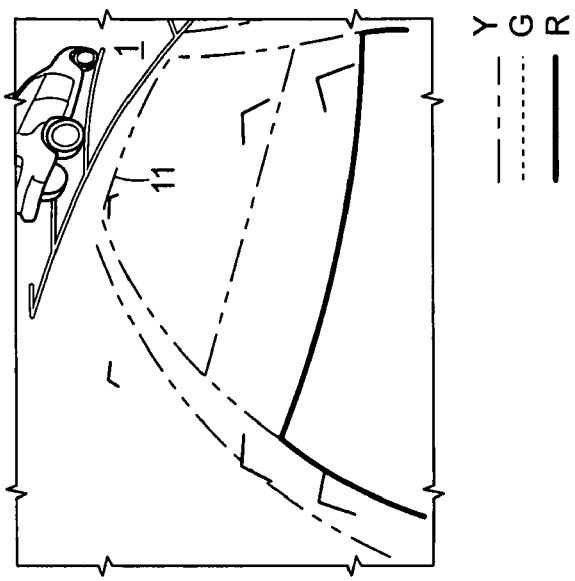
Figure 2B:
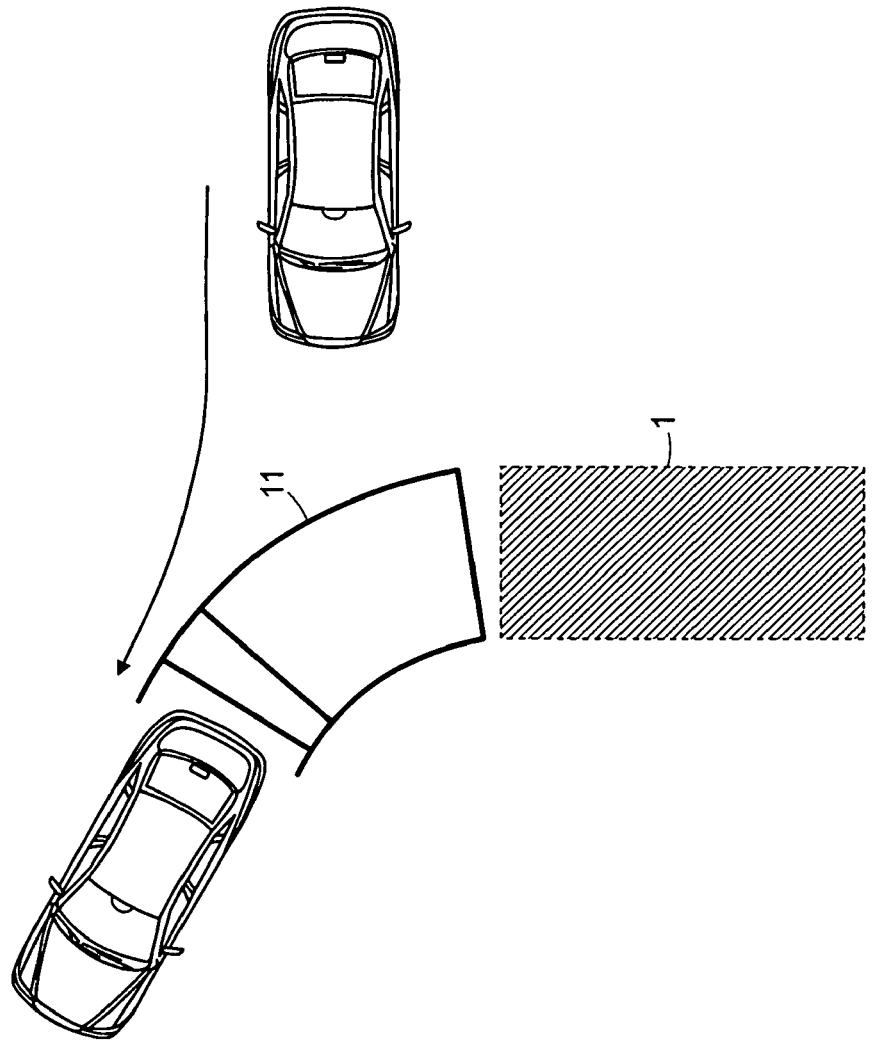

Reference numerals set forth in the Drawings includes reference to the following elements as further discussed below:

| | |
|---|---|
| 1: actual parking space | 11: estimated backward track |
| 12: estimated parking space | 111: camera |
| 112: steering angle sensor | 113: input means |
| 114: controller | 115: estimation unit |
| 116: image synthesizing unit | 117: monitor |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

The present provides a parking guidance method for a vehicle that displays on a monitor a straight section (estimated parking space) based on a relative angle input by a driver and an estimated backward track according to a steering angle, thereby enhancing driver's convenience and safety in the event of back-in perpendicular parking.

More particularly, the present invention aims at providing easier and more accurate guidance for the back-in perpendicular parking by displaying an estimated backward track and an estimated parking space on the monitor. The estimated backward track is created from a steering angle in accordance with the operation of a steering wheel from a stop position of the vehicle. The estimated parking space is obtained from a predetermined value input by the driver through a separate input means, i.e., from a relative angle between the current position of the vehicle and the estimated parking space.

According to the present invention, if the driver determines a steering angle by operating the steering wheel in a state where the vehicle is stopped and inputs a relative angle through the input means, the parking guidance method of the present invention synthesizes the estimated backward track and the estimated parking space with an image of the rear of the vehicle taken by a camera and display the synthesized image on the monitor, thus providing easier and more accurate parking guidance for the back-in perpendicular parking to the driver.

Figure 3:
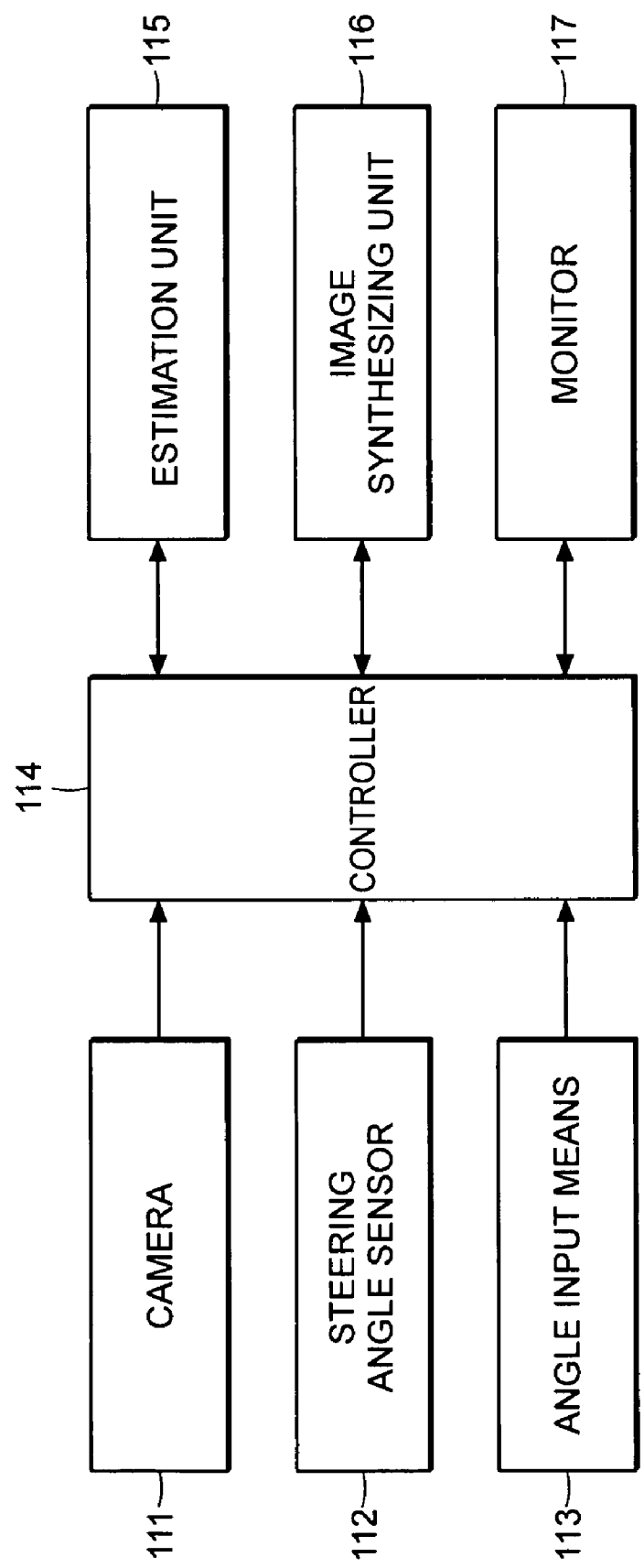
FIG. 3 is a configuration diagram of a parking guidance system in accordance with a preferred embodiment of the present invention.

FIG. 3 is a configuration diagram of a parking guidance system implementing the present methods as described above.

As depicted in the figure, the parking guidance system may comprise: a camera 111 taking an image of the rear of a vehicle and outputting an image signal; a steering angle sensor 112 detecting a current steering angle of the vehicle in accordance with the operation of a steering wheel by a driver and outputting a steering angle signal; an input means 113 provided to input a relative angle, i.e., a predetermined value input by the driver when the vehicle moves into a parking space; a controller 114 controlling to synthesize an estimated backward track and an estimated parking space obtained by an estimation unit 115 with a rear image taken by the camera 111 and display the synthesized image on a monitor 117; an estimation unit 115 estimating a current backward track and parking space from the current steering angle and relative angle transmitted through the controller 114 and outputting signals; an image synthesizing unit 116 receiving the signals representing the estimated backward track and the estimated parking space from the estimation unit 115 and the image signal from the camera 111 to synthesize the estimated backward track and the estimated parking space with the rear image and providing the synthesized image; and a monitor 117 operated under the control of the controller 114 to display the synthesized image output from the image synthesizing unit 116.

Figure 4:
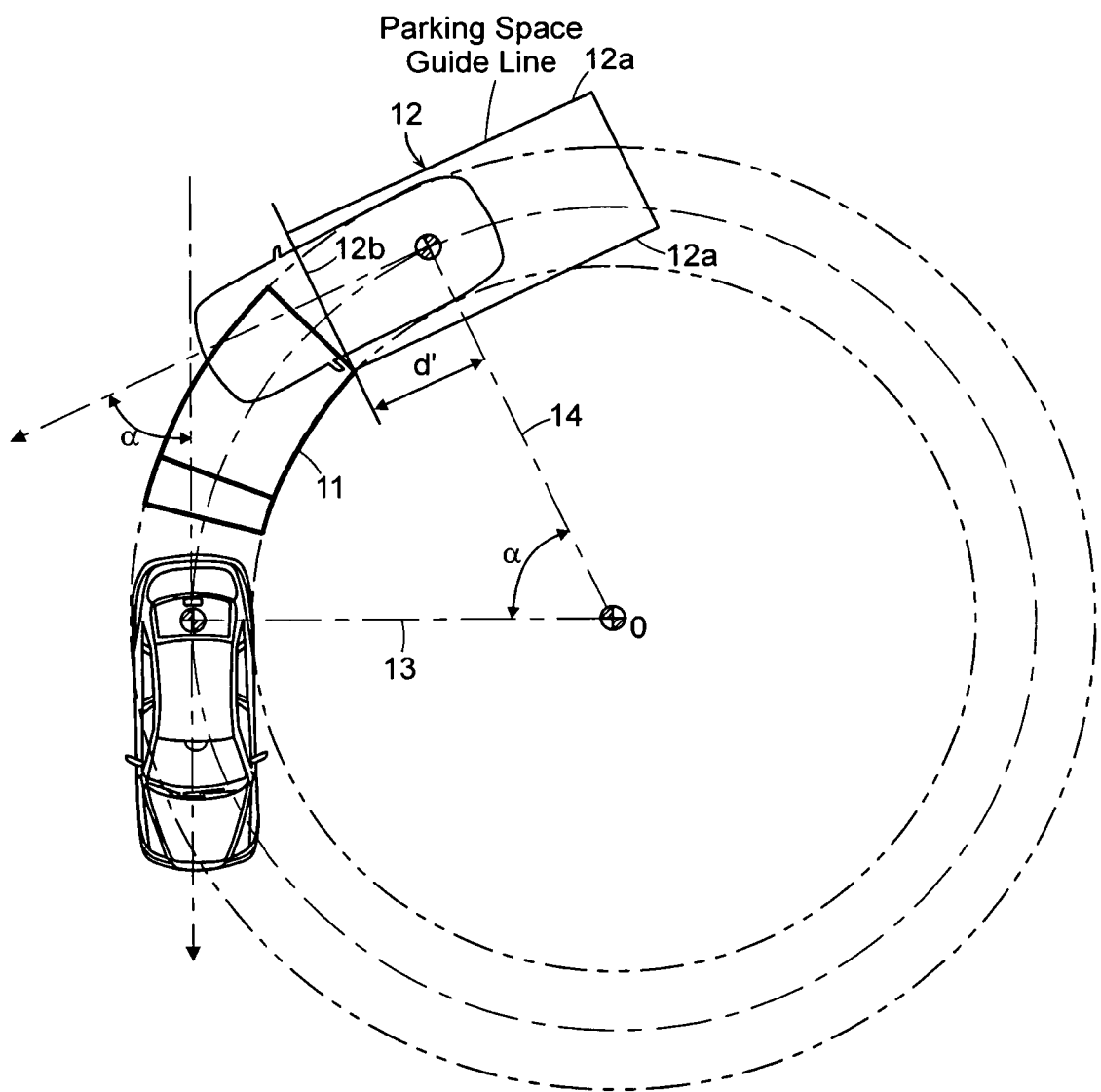
FIG. 4 is a diagram showing how an estimated backward track in connection with a steering angle and an estimated parking space from a relative angle are set in accordance with the present invention.
Figure 5:
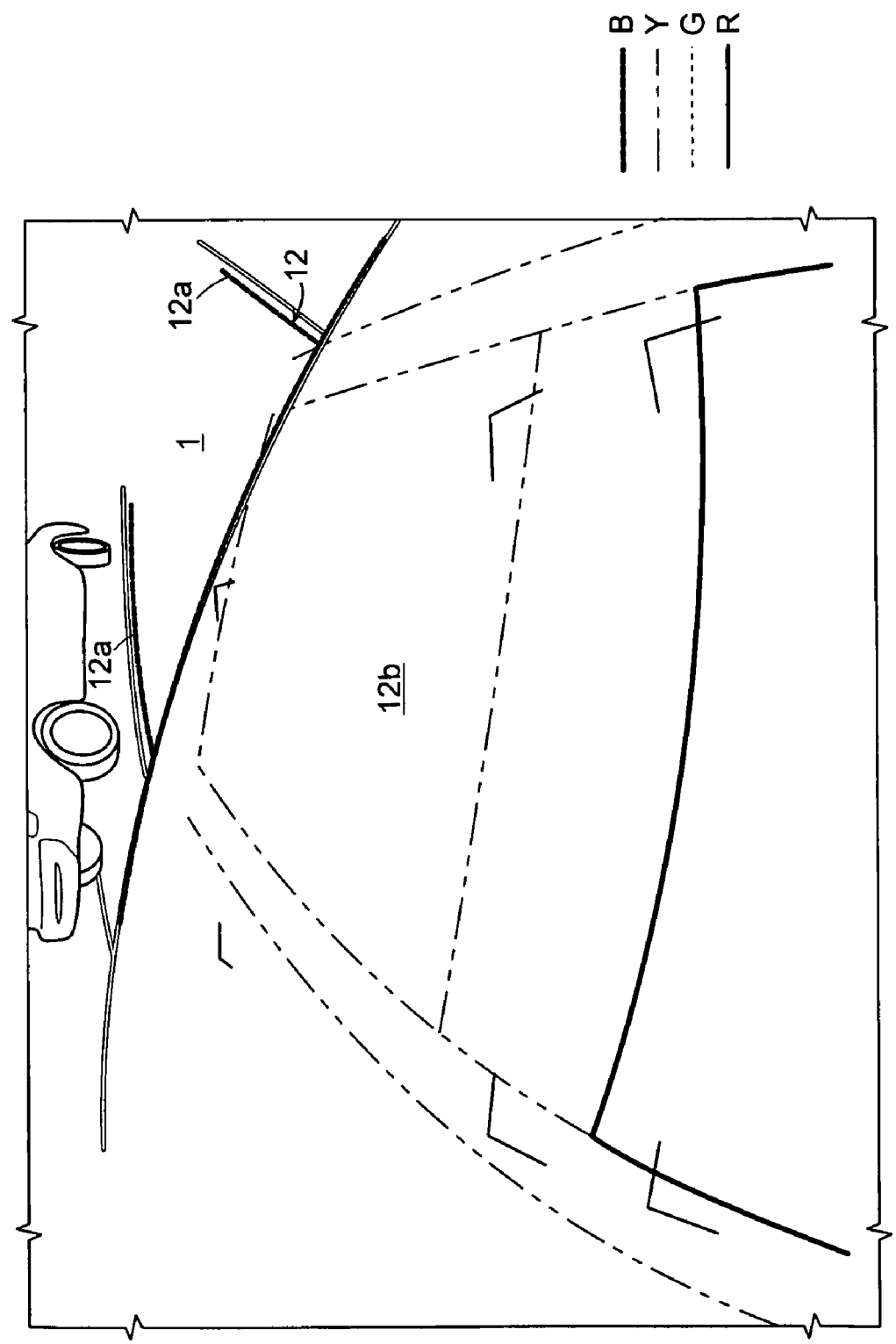
FIG. 5 is a diagram illustrating an estimated backward track and an estimated parking space actually displayed on a monitor in accordance with a preferred embodiment of the present invention.

FIG. 4 is a diagram showing how an estimated backward track in connection with a steering angle and an estimated parking space from a relative angle are set in accordance with the present invention. That is, FIG. 4 illustrates how an estimated backward track 11 is obtained from a steering angle and how an estimated parking space 12 is obtained from a relative angle α input by the driver. The estimated backward track 11 and estimated parking space 12 actually displayed on the monitor 117 is shown in FIG. 5.

According to a preferred embodiment, to perform a back-in perpendicular parking in the form of T, the driver first identifies the front of a parking space and drives the vehicle forward in a direction perpendicular to the parking space. While passing through the front of the parking space, the driver turns the steering wheel, for example, slightly right so as to move the vehicle slightly right and stops the vehicle.

Then, the driver turns the steering wheel in the opposite direction, i.e., left. At this time, a steering angle is input to the estimation unit 115 through the controller 114.

Subsequently, the estimation unit 115 calculates an estimated rotating track of the vehicle, i.e., an estimated backward track 11 based on the steering angle signal input from the steering angle sensor 112 and outputs a signal representing the estimated backward track 11 to the controller 114.

Next, the controller 114 transmits the signal representing the estimated backward track 11 together with the image signal input from the camera 111 to the image synthesizing unit 116.

The image synthesizing unit 116 synthesizes the estimated backward track signal and the image signal input through the controller 114 to create a synthesized image in which the estimated backward track 11 calculated from the current steering angle is drawn on the rear image taken by the camera 111. Subsequently, the synthesized image is supplied to the controller 114 and then displayed on the monitor 117.

If the driver further operates the steering wheel, an estimated backward track 11 calculated from a newly made steering angle is displayed on the monitor 117, and the estimated backward track 11 displayed on the monitor 117 reflects in real time the current steering angle together with the rear image.

Meanwhile, the process of calculating coordinates for the estimated backward track 11 (which is carried out by the estimation unit 115 in the preferred embodiment of the present invention), the process of converting the calculated coordinates into image coordinates through a camera modeling, i.e., a three-dimensional mapping, to synthesize the image coordinates with the rear image (which is carried out by the image synthesizing unit 116), and the process of displaying the synthesized image on the monitor 117 can be performed by known methods in the art. For example, calculation of the estimated backward track 11 can be performed by a method described in FIG. 1 and the equation $R=l/\tan \phi$ above.

Moreover, if the driver drives the vehicle along the current estimated backward track 11 being displayed on the monitor 117, the driver may further input a relative angle α which is made by a vehicle at a position ready for parking (i.e., at a stop position) and an estimated parking space 12. The relative angle α is input for setting the estimated parking space 12 in a tangential direction of the estimated backward track 11. The relative angle α is input through the input means 113 after determining the steering angle at the current vehicle stop position.

The relative angle α input through the input means 113 is supplied to the estimation unit 115 through the controller 114. The estimation unit 115 calculates an estimated parking space 12 based on the estimated backward track 11, obtained at the current steering angle, and the relative angle α input by the driver, and outputs a signal representing the estimated parking space 12 to the controller 114.

Subsequently, the controller 114 transmits the signal representing the estimated parking space 12 to the image synthesizing unit 116 so that the image synthesizing unit 116 creates a synthesized image in which the estimated parking space 12 is drawn on the rear image taken by the camera 111.

That is, the image synthesized in the image synthesizing unit 116 is directed to an image in which the estimated backward track 11 in accordance with the steering angle and the estimated parking space 12 in accordance with the relative angle α are drawn on the rear image taken by the camera 111. If the synthesized image is transmitted to the controller 114, the rear image including the estimated backward track 11 and the estimated parking space 12 is displayed on the monitor 117.

The input means 113 may have various forms. For example, it may be provided as a key pad for inputting numerals for the relative angle α, a knob for increasing and decreasing the numeral displayed on the monitor, or the like.

As depicted in FIG. 4, if the steering angle is determined according to the operation of the steering wheel by the driver, the estimation unit 115 calculates an estimated backward track 11 of the vehicle, which becomes a rotating track in a case where the vehicle is moved backward at the current steering angle, based on the current steering angle information detected by the steering angle sensor 112. Subsequently, if the driver inputs a relative angle α in a state where the estimated backward track 11 is determined, an estimated parking space 12 that is a tangential direction of the rotating track and also forms with the vehicle direction an angle same as the relative angle α.

Referring to the figure, the relative angle α is defined as an angle formed by (i) a reference line 13 which at a stop position 'before' moving, connects a point O, a rotating center point of the vehicle moved backward at the current steering angle (i.e., a rotating center point while the vehicle follows the estimated backward track) to a central point C of a rear wheel axle at the current vehicle position and (ii) a straight line 14 which at a position 'after' moving backward while keeping the steering angle, connects the rotating center point O to the central point C of the rear wheel axle. The relative angle α also refers to an angle formed by a longitudinal axis of the vehicle at a vehicle stop position for parking (a stop position where the relative angle is input) and a longitudinal axis of the vehicle at a position where the vehicle is moved backward along the backward track while keeping the steering angle.

The estimated parking space 12 used herein refers to a space in a tangential direction of the backward track based on the relative angle α at the current steering angle. The relative angle 12 refers to an angle determining the position of a tangential direction in the backward track. Accordingly, the estimated parking space 12 based on the relative angle α in the backward track is defined as a minimum rectangular region of the tangential direction enabling the vehicle parking according to vehicle specifications, such as vehicle width, length, etc., based on a position matching the relative angle α in the moving track of the central point C of the rear wheel axle.

As such, if only the relative angle α is input in a state where the estimated backward track 11 is determined, an estimated parking space 12 in the minimum rectangular region enabling the vehicle parking can be obtained based on the central point C of the rear wheel axle matched with the relative angle α. Moreover, it is possible to create an estimated parking space 12 that includes two side guide lines 12a parallel to each other at an interval determined by considering the vehicle width on both sides based on the central point C of the rear wheel axle at a certain position in the backward track matching the relative angle α, and a front guide line 12b marked in a direction perpendicular to the two side guide lines 12a with a predetermined offset distance d' from the rear wheel axle toward the front of the vehicle.

Referring to FIGS. 4 and 5, the estimated parking space 12 corresponds to a space marked with the two side guide lines 12a and the front guide line 12b in the rear of the estimated backward track 11.

The estimation unit 115 calculates the guide lines of the estimated backward track 11 and the estimated parking space 12 and outputs their coordinates extracted to the image synthesizing unit 116 through the controller 114. The image synthesizing unit 116 converts the thus extracted coordinates representing the estimated backward track (track lines) 11 and the estimated parking space (guide lines) 12 into image coordinates through the three-dimensional mapping and synthesizes the converted image coordinates with the rear image taken by the camera 111.

In the process of synthesizing the estimated backward track 11 and the estimated parking space 11 with the rear image to display the synthesized image on the monitor 117, the coordinates representing the track lines of the estimated backward track 11 and the guide lines 12a and 12b of the estimated parking space 12 are converted into image coordinates and synthesized with the rear image, in which the three-dimensional mapping using the well-known Halpin-Tsai equation may be used and carried out in accordance with a conventional method for displaying an estimated backward track on a monitor.

While the vehicle follows the rotating track in a state where the steering angle is maintained, if the vehicle is moved straight backward after releasing the steering angle completely wherever the vehicle is positioned in the rotating track, the vehicle can move (straight backward) along the rotating track and in the contact direction.

Accordingly, the driver adjusts the steering angle and the relative angle α so that the estimated parking space 12, marked on the rear image of the monitor 117, meets with an actual parking space 1, and then drives the vehicle backward to enter the actual parking space 1 in a state where the estimated parking space 12 meets with the actual parking space 1. If the vehicle enters the actual parking space 1 to some degree, the driver operates the steering wheel to completely release the steering angle and drives the vehicle straight backward so that the vehicle enters the actual parking space 1 completely.

Figure 6A:
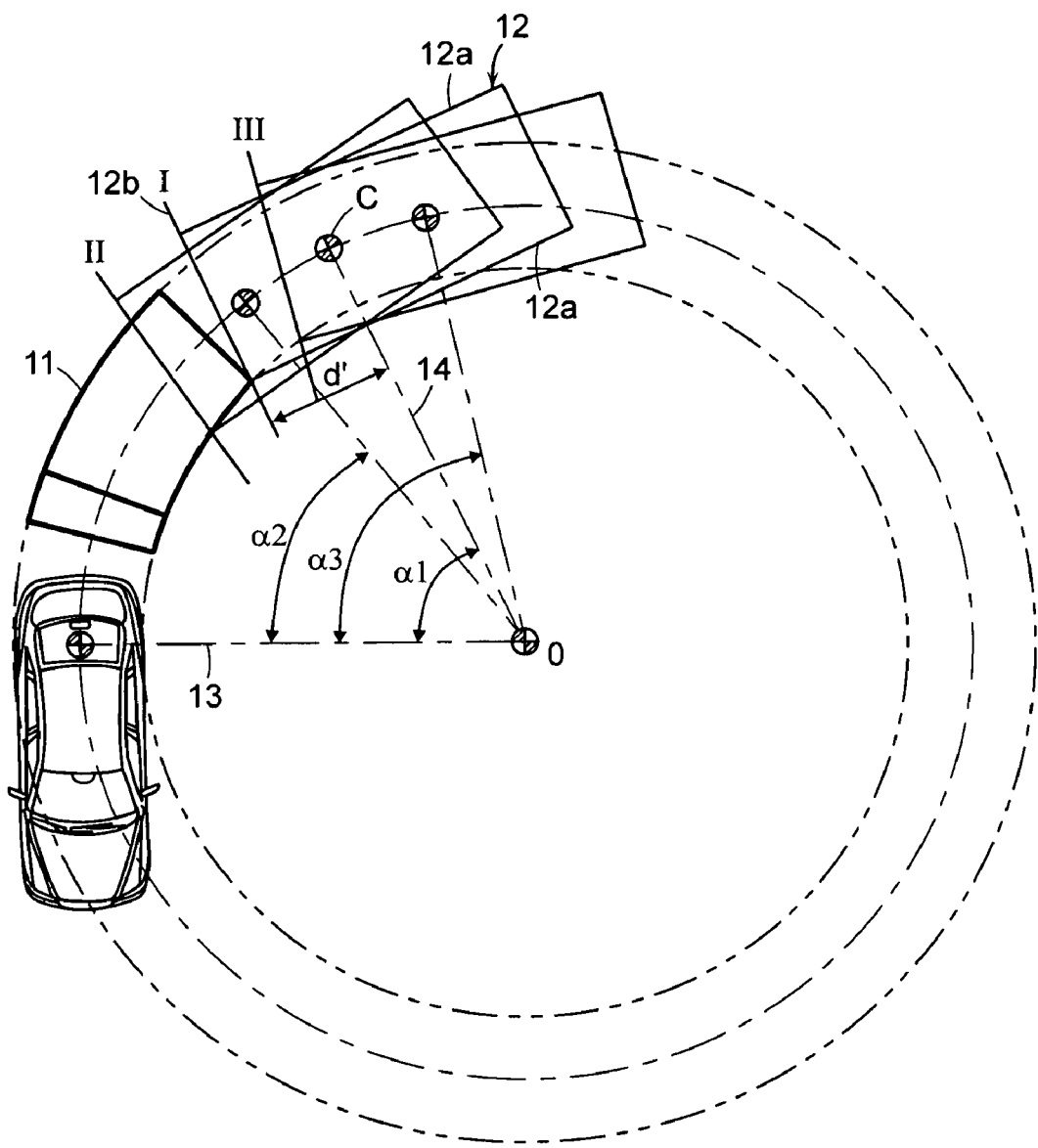
FIG. 6A is a plan view illustrating how an estimated parking space changes with respect to a relative angle in accordance with a preferred embodiment of the present invention.
Figure 6B:
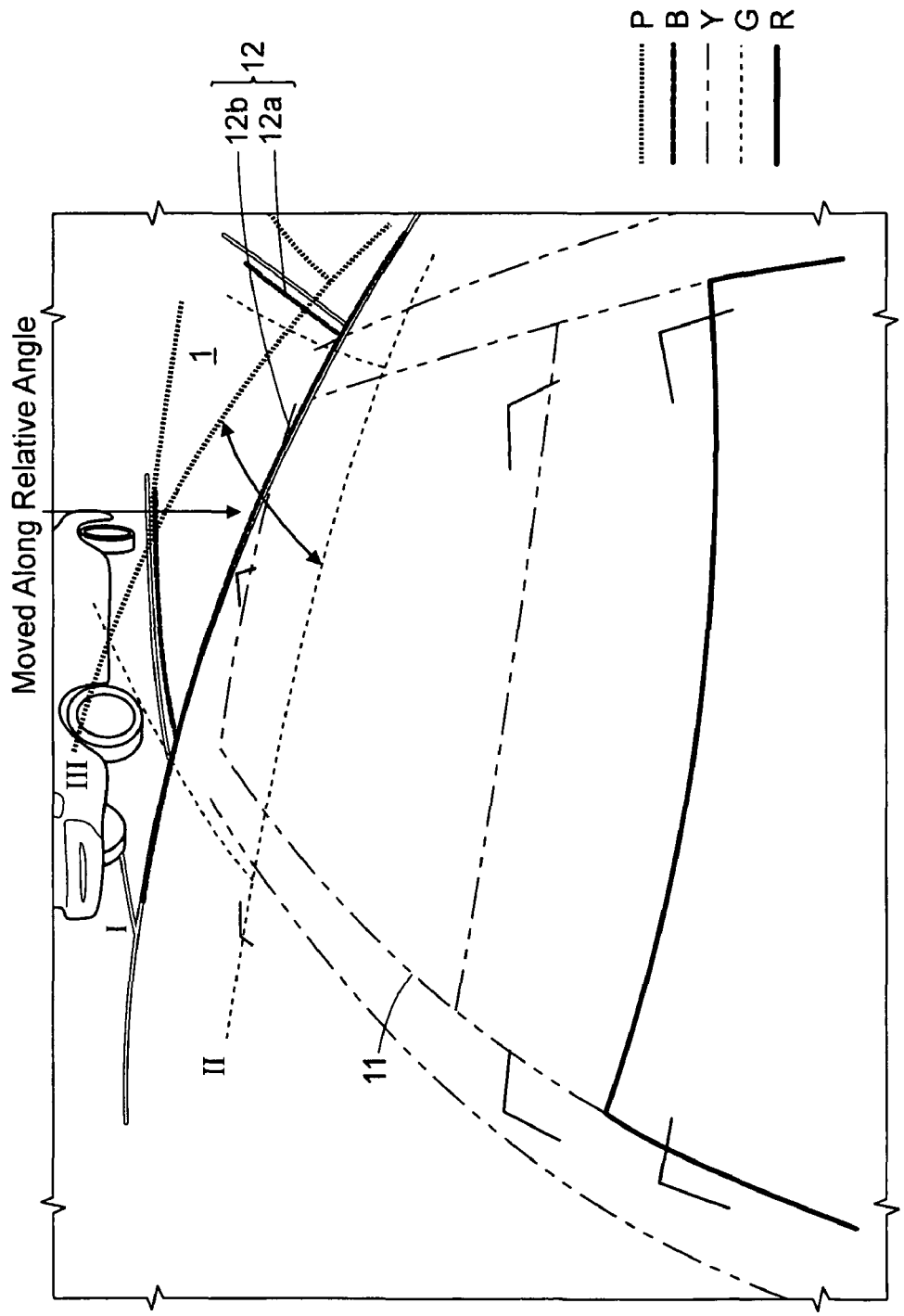
FIG. 6B is a diagram showing an estimated parking space actually displayed on a monitor, which changes with respect to a relative angle input by a driver in accordance with a preferred embodiment of the present invention.

FIG. 6A is a plan view illustrating how an estimated parking space changes with respect to a relative angle in accordance with a preferred embodiment of the present invention and FIG. 6B is a diagram showing an estimated parking space actually displayed on a monitor, which changes with respect to a relative angle input by a driver in accordance with a preferred embodiment of the present invention.

In the figures, I represents an estimated parking space 12 determined if an appropriate angle α1 is input as the relative angle, II represents an estimated parking space 12 if an angle α2 input is smaller than the appropriate angle α, and III represents an estimated parking space 12 if an angle α3 input is greater than the appropriate angle α1.

In case of II, the driver should adjust the relative angle α2 larger using the input means 113 and, in case of III, the driver should adjust the relative angle α3 smaller.

As depicted in the figures, the estimated parking space 12 displayed on the monitor 117 in accordance with the adjusted relative angles α1 to α3 is moved to follow the estimated backward track 11 at the current steering angle while keeping the tangential direction of the estimated backward track 11.

As such, the driver should adjust the input value of the relative angles α1 to α3 using the input means 113 so as to rotationally move the estimated parking space 12 until the space 12 displayed on the monitor 117 is parallel to the actual parking space.

Moreover, if the estimate parking space 12 parallel to the actual parking space is ensured, the driver should adjust the steering wheel additionally so that the estimated parking space 12 is moved parallel to enter the actual parking space 1, depicted in FIG. 5, displayed on the monitor 117.

Figure 7A:
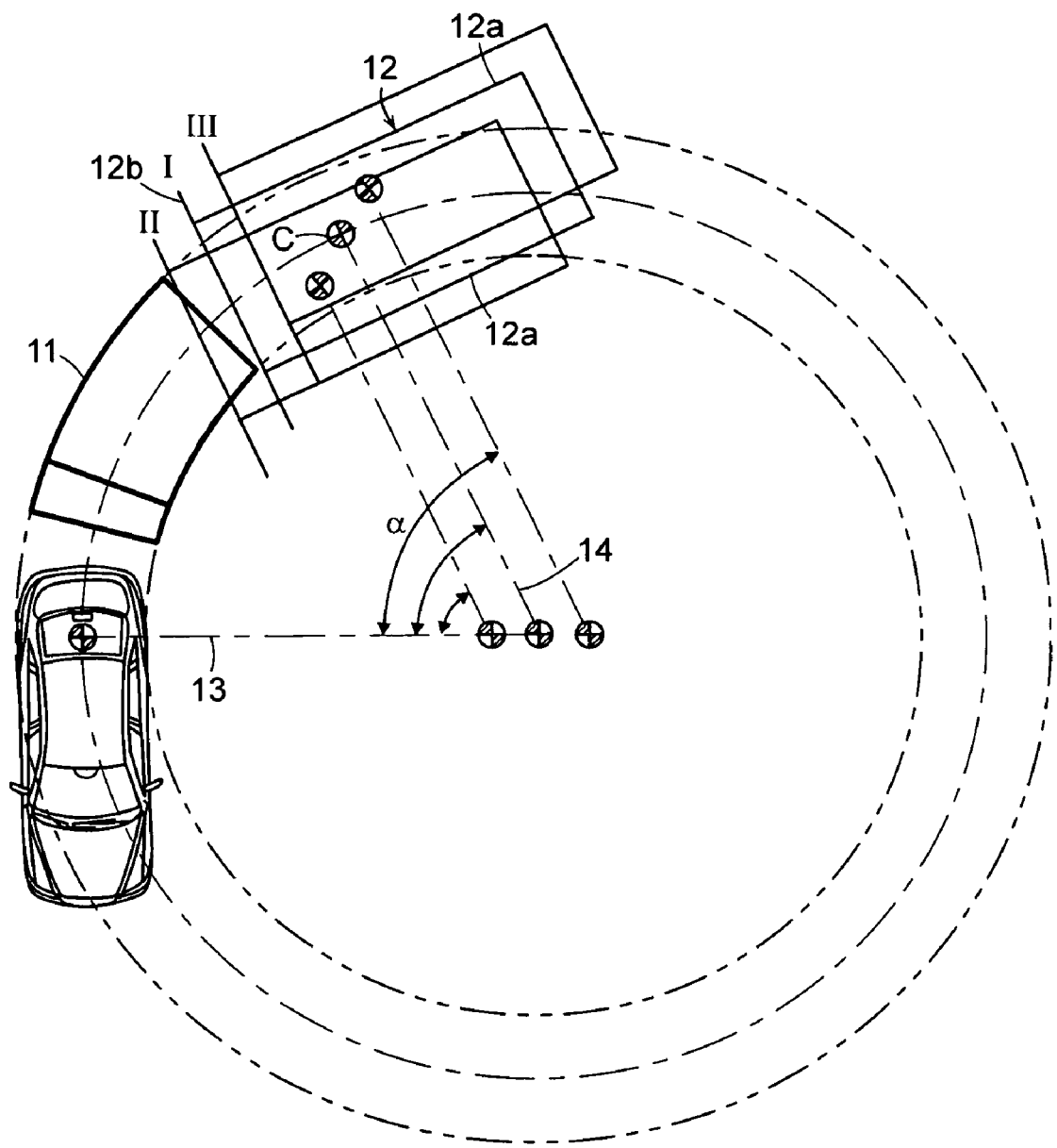
FIG. 7A is a plan view illustrating how an estimated parking space changes with respect to a steering angle in accordance with a preferred embodiment of the present invention.
Figure 7B:
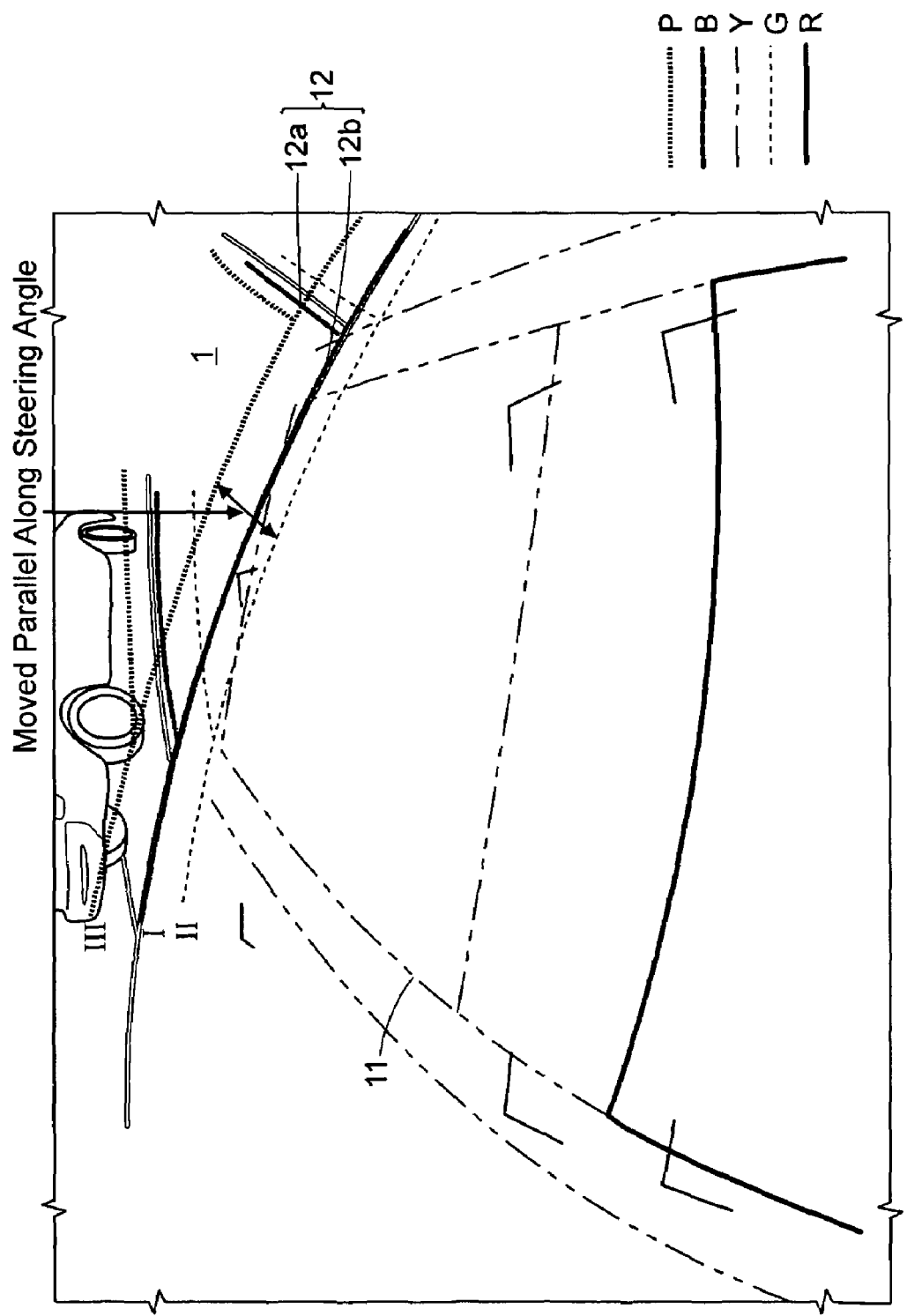
FIG. 7B is a diagram showing an estimated parking space actually displayed on a monitor, which changes with respect to a steering angle adjusted by a driver in accordance with a preferred embodiment of the present invention.

FIGS. 7A and 7B are diagrams showing an example in which an estimated parking space meets with an actual parking space by operating the steering wheel by the driver.

In the figures, I represents an estimated parking space 12 when the steering angle is appropriate, II represents an estimated parking space 12 when the steering angle is smaller than the appropriate angle, and III represents an estimated parking space 12 when the steering angle is greater than the appropriate angle. In case of II, the driver should adjust the steering angle larger by adjusting the steering wheel and, in case of III, the driver should adjust the steering angle α3 smaller.

As depicted in the figures, in accordance with the adjustment of the steering angle, the estimated parking space 12 displayed on the monitor 117 is moved parallel to be positioned on the estimated backward track 11 at the adjusted steering angle while keeping the tangential direction of the estimated backward track 11.

Like this, the driver moves the estimated parking space 12 displayed on the monitor 117 to meet with the actual parking space 1 by adjusting the steering angle and the relative angle α and then drives the vehicle backward to be parked. At this time, if the vehicle is moved backward along the estimated backward track 11 and thereby if a portion of the vehicle enters the estimated parking space 12 as depicted in FIG. 4, the driver drives the vehicle straight backward in the contact direction of the estimated backward track 11 to be completely parked.

The parking guidance methods according to present invention, as described above, display the estimated parking space 12 determined by the steering angle and the relative angle α together with the estimate backward track 11 determined by the steering angle on the rear image screen of the monitor. Accordingly, if the driver adjusts the steering angle and the relative angle α so that the estimated parking space 12 meets with the actual parking space 1, it is possible to easily and accurately drive the vehicle backward in a desired parking space.

As described above, according to the parking guidance methods for a vehicle of the present invention, an estimated parking space is displayed on the monitor, based on the steering angle and the relative angle input by the driver on the monitor, in addition to an estimated backward track in connection with a steering angle, when the driver performs a back-in perpendicular parking, thus enhancing driver's convenience and safety for the back-in perpendicular parking.

In the present invention, if only the driver adjusts the steering angle and the relative angle so that the estimated parking space displayed on the monitor meets with the actual parking space, an easy and simple parking is provided and thereby it is possible to reduce an accidental collision even in case of an beginner.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A parking guidance method for a vehicle comprising:
    calculating an estimated backward track of the vehicle from a current steering angle detected by a steering angle sensor;
    calculating an estimated parking space from the estimated backward track and a relative angle inputted by a driver through an input means;
    converting coordinates of the calculated estimated backward track and estimated parking space into image coordinates;
    synthesizing the converted image coordinates with an image acquired by a camera provided at the rear of the vehicle; and
    displaying the synthesized image on a monitor of the vehicle,
    wherein the relative angle is an angle formed by a longitudinal axis of the vehicle which stops to park and a longitudinal axis of the vehicle which is placed in the estimated parking space,
    wherein as the driver adjusts the relative angle by the driver operating the input means the estimated parking space is rotationally moved so as to fit the estimated backward track with respect to the current steering angle and the estimated parking space after the rotational movement is further displayed on the monitor, and
    wherein when the driver adjusts a steering wheel angle by operation of the steering wheel the estimated parking space is moved in parallel so as to fit an estimated backward track with respect to an adjusted steering angle and the estimated parking space after the parallel movement is further displayed on the monitor.

2. The method of claim 1, wherein when the driver adjusts the steering wheel angle by operation of steering wheel, the estimated parking space is moved in parallel so as to fit an estimated backward track with respect to an adjusted steering angle and the estimated parking space after the parallel movement is further displayed on the monitor.

3. The method of claim 1, wherein the estimated parking space is a space placed on the estimated backward track at a position that satisfies the relative angle, the longitudinal direction of the space being in the direction tangential to the estimated backward track.

4. The method of claim 3, wherein the estimated parking space comprises: two side guide lines which are in a direction tangential to the estimated backward track and are parallely spaced from each other with a distance that can receive a vehicle; and
    a front guide line which is in a direction perpendicular to the two side guide lines with a predetermined offset distance from the rear wheel axle toward the front of the vehicle.

5. The method of claim 1 wherein the estimated parking space is calculated from the estimated backward track and a relative angle manually inputted by a driver through an input means.

6. The method of claim 5 wherein the relative angle manually inputted through the input means is supplied to an estimation unit.

7. The method of claim 5 wherein the relative angle manually inputted through the input means is supplied to an estimation unit through a controller unit.

8. The method of claim 6 wherein estimation unit calculates an estimated parking space based on the relative angle manually input by the driver.

9. The method of claim 7 wherein the estimation unit outputs a signal representing the estimated parking space to the controller.

10. The method of claim 5 wherein the input means comprises a key pad.

11. The method of claim 5 wherein the input means comprises a knob.

12. The method of claim 1 wherein the relative angle inputted through the input means is supplied to an estimation unit.

13. The method of claim 12 wherein the relative angle inputted through the input means is supplied to an estimation unit through a controller unit.

14. The method of claim 12 wherein estimation unit calculates an estimated parking space based on the relative angle.

15. The method of claim 13 wherein the estimation unit outputs a signal representing the estimated parking space to the controller.

16. The method of claim 1 wherein the input means comprises a key pad.

17. The method of claim 1 wherein the input means comprises a knob.

18. A parking guidance method for a vehicle comprising:
    calculating an estimated backward track of the vehicle from a current steering angle detected by a steering angle sensor;

calculating an estimated parking space from the estimated backward track and a relative angle inputted by a driver through an input means;

converting coordinates of the calculated estimated backward track and estimated parking space into image coordinates;

synthesizing the converted image coordinates with an image acquired by a camera provided at the rear of the vehicle; and displaying the synthesized image on a monitor of the vehicle, wherein the relative angle is an angle formed by (i) a reference line which at a stop position before moving, connects a point, the first point a rotating center point of the vehicle as it is moved backward based on the angle of the steering wheel, to a current vehicle position and (ii) a straight line which at a position generated as a result of the backward movements, and wherein when the driver adjusts a steering wheel angle by operation of the steering wheel, the estimated parking space is moved in parallel so as to fit the estimated backward track with respect to an adjusted steering angle and the estimated parking space after the parallel movement is further displayed on the monitor.

* * * * *

UNITED STATES PATENT AND TRADEMARK OFFICE
CERTIFICATE OF CORRECTION

| | | |
|---|---|---|
| PATENT NO. | : 8,258,933 B2 | Page 1 of 1 |
| APPLICATION NO. | : 11/982698 | |
| DATED | : September 4, 2012 | |
| INVENTOR(S) | : Son | |

It is certified that error appears in the above-identified patent and that said Letters Patent is hereby corrected as shown below:

On the title page Item [73] should read -- Kia Motors Corporation, Seoul, KR --

Signed and Sealed this
Twenty-fifth Day of March, 2014

Michelle K. Lee
*Deputy Director of the United States Patent and Trademark Office*